March 28, 1967  G. L. HERSHEY ET AL  3,311,155
SEALED COMBUSTION GAS FURNACE
Filed July 12, 1965　　2 Sheets-Sheet 1
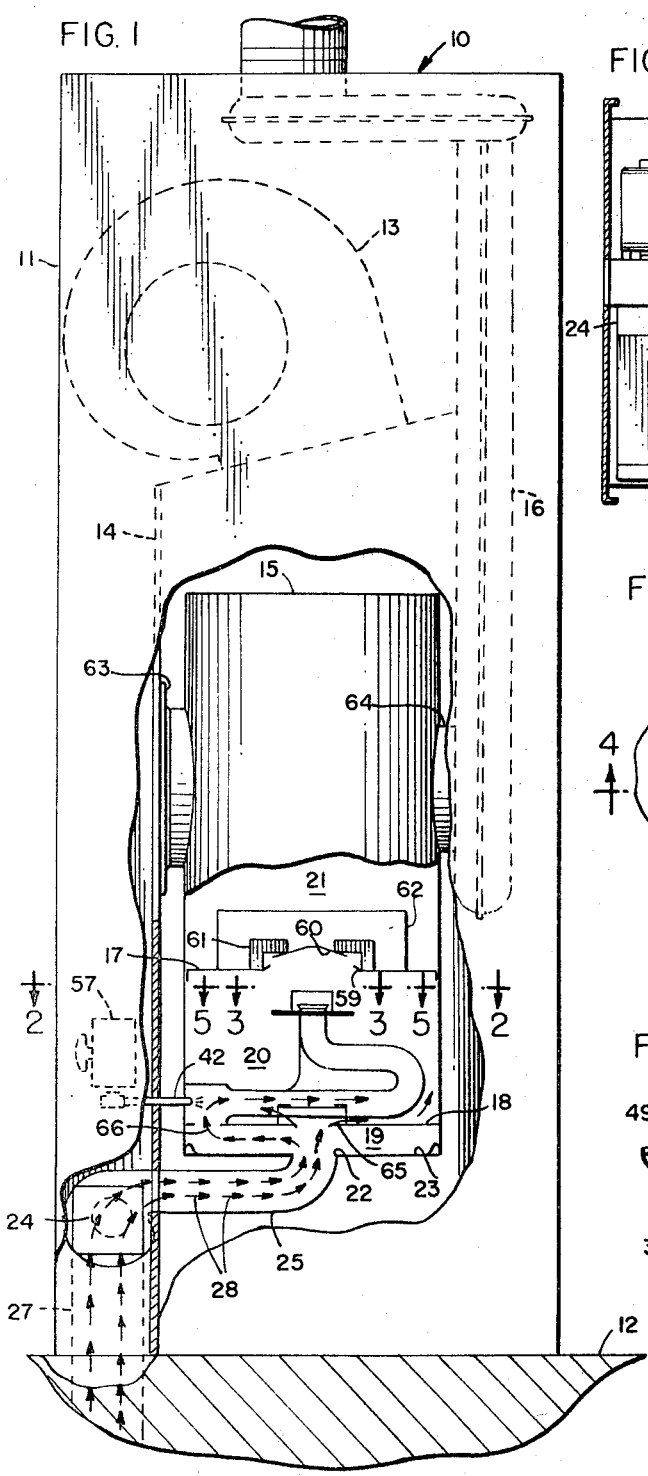
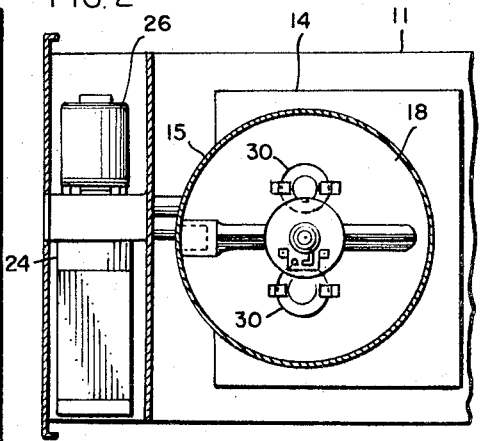
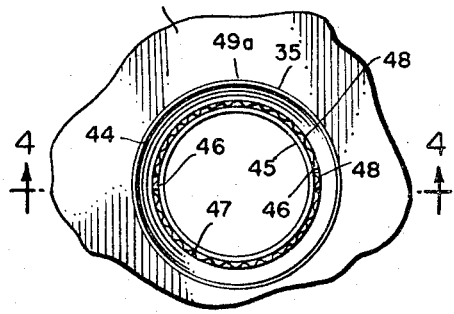
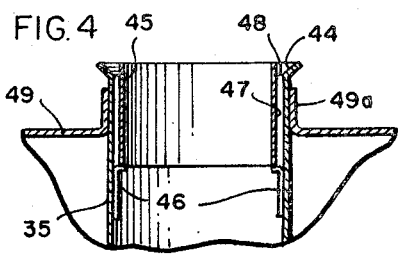
INVENTORS
GERALD L. HERSHEY
FRANK A. LOWE
BY: *Dawson, Tilton, Fallon, Lungmus & Alexander*
ATT'YS

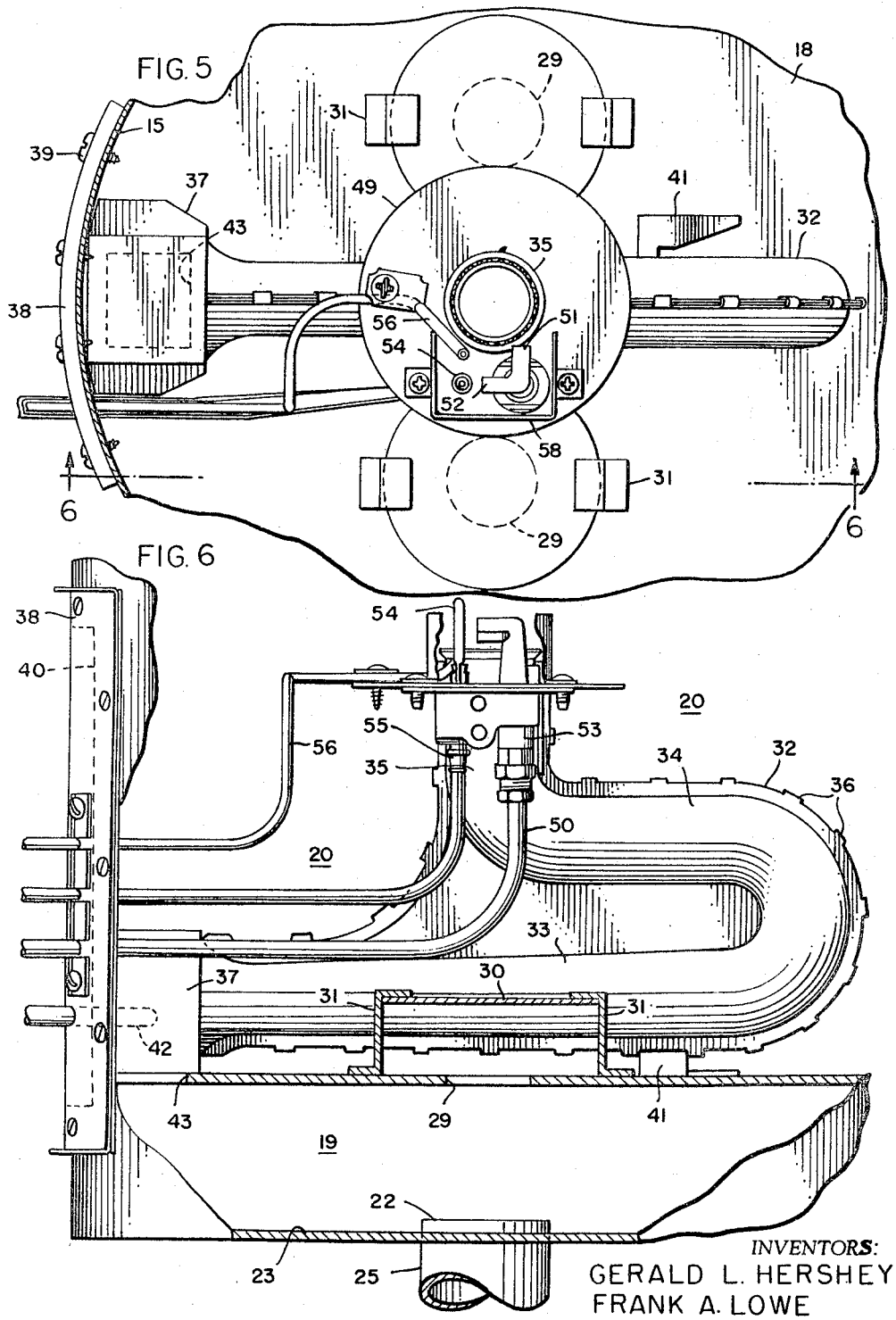

United States Patent Office 3,311,155
Patented Mar. 28, 1967

3,311,155
SEALED COMBUSTION GAS FURNACE
Gerald L. Hershey and Frank A. Lowe, Wichita, Kans., assignors to The Coleman Company, Inc., Wichita, Kans., a corporation of Kansas
Filed July 12, 1965, Ser. No. 471,048
18 Claims. (Cl. 158—7)

This invention relates to a gas furnace in which combustion air is supplied from sources external to the space to be heated and in which the combustion chamber of the furnace is therefore "sealed" from the air in such space.

Sealed combustion furnaces are particularly suitable for use in mobile homes and in other confined spaces and, for such uses, must be relatively compact. While compactness has not by itself posed difficult design problems, most furnaces intended for such uses achieve compactness at the expense of quietness of operation. In general, the compact furnaces suitable for use in mobile homes and in other small living areas tend to be objectionably noisy at the commencement of combustion and at different operating levels.

Another common disadvantage characteristic of relatively small furnaces relates to limitations in their "turn down" ratios. Such units permit only limited adjustment of the gas supply, at least without major adjustments in the air supply, with the result that the furnaces cannot be readily adjusted by users to satisfy the heating requirements demanded by a wide range of climatic conditions.

Accordingly, it is a main object of the present invention to provide a compact sealed combustion furnace which overcomes the aforementioned defects and disadvantages of prior units intended for use in heating mobile homes and other confined living or working spaces. More specifically, it is an object to provide a furnace which is relatively quiet during ignition, burning, and extinction over a wide range of operating conditions and fuel adjustment levels. With respect to fuel adjustment levels, it is a further object to provide a gas powered furnace in which the turn down ratio of the power burner is greater than one half the normal rated B.t.u. input, and may approach one fourth of the normal B.t.u. input rate without readjustment of the air supply.

A still further object is to provide a furnace capable of burning either natural or bottled gases with a high degree of combustion efficiency. Specifically, it is an object to provide a furnace in which the primary and secondary air may be reduced to less than five percent excess air without smoke, carbon monoxide, or unburned gases.

Another object is to provide a furnace in which the ratio of primary to secondary air remains substantially constant despite variations of intake or flue exhaust pressures.

Other objects will appear from the specification and drawings in which:

FIGURE 1 is a side elevational view, shown partly in simplified cross section, of a sealed combustion furnace embodying the present invention;

FIGURE 2 is a horizontal sectional view taken along line 2—2 of FIGURE 1;

FIGURE 3 is an enlarged top plan view of the burner tube taken along line 3—3 of FIGURE 1;

FIGURE 4 is a vertical sectional view in the same scale as FIGURE 3 and taken along line 4—4 of FIGURE 3;

FIGURE 5 is an enlarged top plan view of the structure within the expansion chamber, such view being taken along line 5—5 of FIGURE 1 and showing in greater detail the structure indicated generally in FIGURE 2;

FIGURE 6 is an enlarged side elevational view to the same scale as FIGURE 5 and taken along line 6—6 of FIGURE 5.

In the embodiment of the invention illustrated in the drawing, the numeral 10 generally designates a sealed combustion furnace having an outer casing or shell 11 adapted to be mounted on a floor surface 12. Since the construction of the vertically elongated shell is conventional, such shell having the usual ports for the circulation of room air therethrough, a detail discussion of such structure is believed unnecessary herein. In the illustration given, air to be heated by the furnace is circulated by a blower 13, the blower directing air downwardly into the furnace's inner casing 14 and about combustion casing 15. A flue 16 communicates with the casing to carry off exhaust gases.

The combustion casing 15 is vertically elongated and is generally cylindrical in shape, as indicated most clearly in FIGURES 1 and 2. Within the casing, upper and lower horizontal partitions 17 and 18 divide the interior into a lower air pressurization chamber 19, an air expansion chamber 20 above the pressurization chamber, and, at the upper portion of the casing, a combustion chamber 21. The imperforate combustion casing 15 is sealed against room air and the entire supply of primary and secondary air is introduced through a single central inlet 22 in the casing's bottom wall 23, such outside air being pressurized by the operation of a blower 24 and delivered to the pressurization chamber by conduit 25. The blower itself is entirely conventional and is powered by an electric motor 26 (FIGURE 2) or by any other suitable power source. A duct 27 supplies outside air to the blower from beneath floor 12 and, during operation of the blower, fresh air is carried to the pressurization chamber 19 as indicated by the arrows 28 in FIGURE 1.

The structure of, and the components within, the lower air pressurization chamber and the upper air expansion chamber are illustrated in greater detail in FIGURES 5 and 6. It will be observed that horizontal partition 18 is provided with a pair of spaced openings 29 disposed above inlet 22. Within the upper expansion chamber 20, and spaced above each of the openings 29, are a pair of horizontal baffles 30. Each baffle consists of an imperforate disk supported by a pair of brackets 31. As will be brought out more fully hereinafter, the purpose of the baffles is to deflect and spread the secondary air streaming upwardly from the pressurization chamber 19 through openings or ports 29.

Within the air expansion chamber 20 is a gas-air mixing tube 32 which, as illustrated in FIGURE 6, is somewhat circuitous in shape, having a lower horizontal section 33, an intermediate horizontal section 34, and an upper burner section 35. The three sections are arranged in series with the intermediate section 34 doubling back over the lower section 33 and merging with the upstanding burner section 35 disposed along the vertical axis of the cylindrical casing 15. While the tube 32 may be formed in any suitable manner, we have found it particularly advantageous to form it in complementary pieces of pressed sheet material joined together along their flanged edges by locking tabs 36.

The horizontal lower section 33 of the tube extends along the upper surface of partition 18 between inlet openings 29 and baffles 30. A housing 37, constituting an extension of the lower end of the mixing tube, is secured to a removable section 38 of the cylindrical wall of the combustion casing so that upon removal of the screws 39 holding the wall section or panel 38 in place, the entire mixing tube 33, along with the components secured thereto, may be readily removed from the expansion chamber through a side opening 40 provided in the cylindrical casing. If desired, a support 41 may be secured to the upper surface of partition 18 to provide additional support for the mixing tube.

The horizontal section 33 of the mixing tube is shown to be constricted at an intermediate point, and then to enlarge gradually in the direction of the burner section, to provide a Venturi. Within housing extension 37 is a gas discharge nozzle 42 for discharging gas in an axial direction along lower section 33. Housing 37 is open at its bottom and is disposed directly above an orifice or aperture 43 through which primary combustion air passes from the pressurization chamber 19 into the housing and mixing tube.

The burner section 35 of tube 32 is illustrated most clearly in FIGURES 3 and 4. It will be noted that the upper end of the tube is flared outwardly at 44 and that within the upper end of the tube is a concentric sleeve 45. The sleeve is of substantially smaller diameter than the inner diameter of tube section 35 and, at its lower end, is provided with a pair of diametrically disposed outwardly and downwardly extending tabs or legs 46 which are welded or otherwise secured to the inner surface of section 35. Gas may therefore flow upwardly about the tabs into the annular space 47 between sleeve 45 and burner tube 35. A liner or rick-rack 48 has vertical corrugations and is disposed in the annular space 47 between the sleeve and the tube. During operation of the burner, a small portion of the gas-air mixture flows through the annular space 47, and because its velocity is slowed by the rick-rack, provides for a stable retaining flame at the burner's upper end. The outwardly flared upper end 44 of the burner also promotes flame retention by protecting the retaining flame against upwardly flowing secondary air.

Further protection is provided by an annular baffle 49 which is spaced slightly below the upper end of the burner tube and which extends outwardly in a horizontal plane from that tube. The baffle may be secured to tube section 35 in any suitable manner; in FIGURE 4 we show the baffle as being provided with an upstanding collar portion 49a welded or otherwise affixed to the outer surface of the tube.

A conventional pilot tube 50 terminates in a pilot burner 53 with its outlets 51 and 52 disposed immediately adjacent the upper end of tubular burner section 35 and is suitably secured to baffle plate 49. One outlet 51 of the pilot burner is directed towards burner tube 35 for ignition; the other outlet 52 of the pilot is directed towards thermocouple 54 which is secured to baffle plate 49 by means of a suitable clip 55. A bleed tube 56 is also mounted upon the baffle with the end of the bleed tube terminating in close proximity to pilot outlet 52. The opposite end of the bleed tube communicates with valve assembly 57, shown diagrammatically in FIGURE 1, so that any gas which might escape because of malfunctioning of the valve will be carried to the burner and be consumed. The pilot, thermocouple, and bleed tube are all shielded against upwardly flowing secondary air by means of a U-shaped shield 58 which extends upwardly from baffle 49 and which is secured thereto by any suitable means.

Partition 17, which is disposed directly above burner section 35, is provided with an enlarged opening 59 of a diameter substantially the same as the diameter of annular baffle 49. Above opening 59 is a flame target element 60 in the form of a shallow conical disk having its sides sloping downwardly and outwardly and being secured in place by angular arms 61 affixed to partition 17. Surrounding the flame target, and of substantially larger diameter, is a cylindrical shield 62 which assists in forming the flame within combustion chamber 21 during operation of the furnace. In the illustration given, the combustion chamber is provided with a laterally positioned inspection port 63, sealed with a plate of transparent and heat-resistant material and, at the opposite side of the combustion chamber, is a lateral sleeve 64 which communicates with the chamber for conveying combustion gases to flue 16.

*Operation*

In the operation of the furnace, fresh outside air is forced into air pressurization chamber 19 by blower 25 and, as previously indicated, all of the air utilized for combustion is supplied to the combustion casing through the single inlet 22. Some of the air in the pressurization chamber flows upwardly through spaced openings 29 directly into the lower portion of the expansion chamber. The upwardly flowing secondary air is deflected outwardly by baffles 30 and such outward deflection, coupled with the substantially larger volume of the expansion chamber 20 and the lower air pressure existing therein, causes expansion of the secondary air in the lower portion of the enlarged expansion chamber at a level well below burner 35. The path of secondary air in the expansion chamber is indicated in FIGURE 1 by arrows 65.

The B.t.u. input of the furnace is controlled by manually adjustable valve 57 which is connected to a source of gaseous fuel (either natural gas or bottled gas) and which communicates with nozzle 42. The nozzle discharges gas axially into the elongated Venturi tube 32 above primary air orifice or opening 43. Under low flame conditions, when valve 57 is turned down to discharge only a reduced amount of gas into the mixing tube 32, the aspirating effect is minimal. However, the operation of blower 25 and the direct communication between the pressurization chamber 19 and the housing of mixing tube 32 through orifice 43 insures that a sufficient amount of pressurized primary air will enter the mixing tube along the path indicated by arrows 66 (FIGURE 1). As the B.t.u. input is increased, the kinetic energy of the gases discharged from the nozzle 42 into the Venturi tube increases the pressure differential across orifice 43 above the pressure differential across secondary openings 29 and, therefore, the proper proportioning of the gas-air mixture in the Venturi mixing tube is achieved over a wide range of operating conditions.

Thorough mixing of fuel and air within the mixing tube is insured because of the elongated serpentine configuration of tube 32. Because of its length and the thorough mixing of fuel and air therein, the mixing tube, with its elongated horizontal lower section and its reversely turned horizontal intermediate section, is believed to contribute significantly in achieving a low noise level for ignition and combustion.

A particularly important aspects of the invention lies in the fact that the tube 32 terminates in a burner section 35 which is located in the upper portion of the enlarged expansion chamber well above secondary air openings 29. Since expansion of the pressurized air streaming through the openings 29 and impinging on baffles 30 occurs primarily in the lower section of the expansion chamber 20, at a level substantially below burner 35, a "blowtorch" effect at the burner, and the objectionable noise level which would be associated therewith, is avoided. Abundant amounts of secondary air are thereby provided for efficient burner operation without the secondary air velocities at the burner which might otherwise produce the high operating noise levels commonly associated with compact furnaces for mobile homes and the like.

Further reduction in operating noise is achieved by the enlarged baffle 49 which extends outwardly from the upper end of the burner section 35 and which shields the burner against updrafts of secondary air in the immediate vicinity of the burner. As previously indicated, the small portion of relatively slow velocity gas-air mixture passing upwardly through the annular space 47 of the burner, and the outwardly flared lip 44 at the burner's upper end, also contribute in lowering the operating noise level as well as facilitating ignition of the fuel air mixture. In this latter connection, it is believed that the reduced velocity of the mixture discharged from annular space 47 is particularly important in eliminating the popping sound commonly emitted by a conventional gas furnace at the instant of ignition.

The flame from the top of the burner is deflected outwardly by the inverted conical target 60, and the cylindrical baffle or shield 62 then redirects the outwardly flowing gases in an upward direction. At full operation, the major portion of the flame is disposed within combustion chamber 21 and is confined by shield 62.

Unlike most gas power furnaces, the furnace of the present invention has an extremely high turn down ratio. It has been found that the B.t.u. input may be reduced to at least one fourth of the normal B.t.u. input rate (by manual adjustment of valve 57), and that over the full range of adjustment, the amount of primary air passing through orifice 43 in to the mixing tube is metered to meet the demands for efficient combustion. Since the mixing tube remains at all times in open communication with the pressurization chamber through orifice 43, a minimal amount of primary air for combution (as required during low flame operation) is insured as long as blower 25 is in operation.

It has been found that the ratio of primary to secondary air remains substantially constant over a wide range of operating conditions. Variations of intake or flue exhaust pressures, as might be caused by wind velocity pressure effects, will apply equal pressures across the control orifices or openings for the primary and secondary air.

While in the foregoing we have disclosed an embodiment of the invention in considerable detail for purposes of illustration, it will be understood by those skilled in the art that many of these details may be varied without departing from the spirit and scope of the invention.

We claim:

1. In a relatively noiseless sealed combustion gas furnace, a vertically-elongated casing having a generally horizontal partition dividing the casing's interior into a lower air pressurization chamber and an upper expansion chamber, said lower chamber having an inlet for the inflow of air under pressure, blower means communicating with said inlet for delivering air under pressure to said lower chamber, said partition having an opening therethrough for the flow of secondary air directly from said lower chamber to said upper chamber and having an orifice spaced from said opening for the flow of primary air, an elongated mixing tube disposed within said upper chamber, said mixing tube having a Venturi section communicating with the orifice in said partition and having an upper section terminating in a burner in the upper portion of said upper chamber, and a gas discharge nozzle disposed in the lower Venturi section of said tube for discharging gas axially into said tube and for drawing primary air upwardly through said orifice, whereby, both primary and secondary combustion air are supplied from said pressurization chamber to said mixing tube and said upper expansion chamber respectively, the secondary air passing into said upper chamber being free to expand therein at a level substantially below said burner.

2. The structure of claim 1 in which said upper burner section of said tube extends vertically for directing the flame formed at said burner upwardly, and a generally horizontal baffle extending about said burner section for shielding said flame against secondary air flowing upwardly along the outer surface of said upper section.

3. The structure of claim 1 in which said upper burner section of said tube extends vertically for directing upwardly the flame formed at said burner, and a flame target secured to said casing and spaced above said burner, said target comprising a shallow conical plate having downwardly and outwardly sloping sides for directing the flame laterally.

4. The structure of claim 3 in which said casing includes a generally cylindrical shield of substantially larger diameter than said target and extending about said target for redirecting the flame in an upward direction.

5. The structure of claim 1 in which said upper burner section of said tube extends vertically for directing upwardly the flame formed at said burner, said upper section of said tube containing a sleeve of substantially smaller external diameter than the inside diameter of said upper section to provide an annular space therebetween for the peripheral flow of a fuel-air mixture at a relatively low velocity.

6. The structure of claim 5 in which a liner having vertical corrugations and passages is disposed within said annular space.

7. The structure of claim 1 in which said upper burner section of said tube extends vertically for directing upwardly the flame formed at said burner, the upper end of said upper section being flared outwardly to provide an outwardly extending annular lip.

8. In a relatively noiseless sealed combustion gas furnace, a vertically elongated casing having a generally horizontal partition dividing the casing's interior into a lower air pressurization chamber and into an upper air expansion chamber of substantially greater vertical extent than said lower chamber, said lower chamber having an inlet for the inflow of air under pressure, blower means communicating with said inlet for delivering air under pressure to said lower chamber, said partition having a pair of spaced openings therethrough for the outward flow of secondary air directly from said lower chamber to said upper chamber and having an orifice spaced from said openings for the upward flow of primary air, an elongated mixing tube disposed within said upper chamber and between said openings of said partition, said mixing tube having a lower Venturi section communicating with said orifice and having an upper section terminating in a burner in the upper portion of said partition spaced substantially above said partition, and a gas discharge nozzle disposed in the lower Venturi section of said mixing tube for discharging gas axially into said tube and for drawing primary air upwardly through said orifice.

9. The structure of claim 8 in which said Venturi section of said mixing tube extends horizontally along said partition and merges with a reversely turned horizontal section disposed above said Venturi section, said reversely turned horizontal section merging with said upper burner section, and said upper burner section extending vertically and terminating at its upper end to provide a burner opening.

10. The structure of claim 8 in which said upper burner section of said tube extends vertically for directing upwardly the flame formed at said burner, and a generally horizontal baffle extending about said burner section for shielding said flame against secondary air flowing upwardly immediately adjacent said upper section.

11. The structure of claim 10 in which said baffle is flat and is generally circular in shape.

12. The structure of claim 8 in which a pair of horizontal baffles are mounted upon said partition and are spaced directly above said openings for directing secondary air entering said expansion chamber in lateral directions.

13. The structure of claim 8 in which said upper burner section of said tube extends vertically for directing upwardly the flame formed at said burner, and a flame target secured to said casing and spaced above said burner, said target comprising a shallow conical plate having downwardly and outwardly sloping sides for directing the flame laterally.

14. The structure of claim 13 in which said casing includes a generally cylindrical shield of substantially larger diameter than said target and extending about said target for redirecting the flame in an upward direction.

15. In a relatively noiseless sealed combustion gas furnace, a vertically elongated casing having a generally horizontal partition dividing the casing's interior into a lower air pressurization chamber and into an upper air expansion chamber of substantially greater vertical dimensions than said lower chamber, said lower chamber having an inlet for the inflow of air under pressure, said partition having at least one opening therethrough for the flow of secondary air directly from said lower chamber to said upper chamber and having an orifice spaced from said opening for the upward flow of primary air, a horizontal baffle mounted upon said partition and spaced directly above said opening for directing secondary air laterally into the lower portion of said upper chamber, an elongated mixing tube disposed within said upper chamber, said mixing tube having a lower Venturi section communicating with said orifice and having an upper section terminating in an upwardly directed burner in the upper portion of said upper chamber and spaced substantially above said partition and said baffle, and a gas discharge nozzle disposed in said lower Venturi section for discharging gas axially into said tube and for drawing primary air upwardly through said orifice.

16. The structure of claim 15 in which said furnace includes blower means communicating with said inlet for delivering air under pressure to said lower chamber.

17. The structure of claim 15 in which a pair of said openings are provided in said partition and are disposed on opposite sides of said mixing tube.

18. The structure of claim 15 in which a generally horizontal baffle plate is secured to said burner for shielding the flame formed at said burner against secondary air flowing upwardly along the upper section of said mixing tube.

References Cited by the Examiner
UNITED STATES PATENTS

| | | | |
|---|---|---|---|
| 2,178,703 | 11/1939 | Robbins | 158—7 |
| 2,963,083 | 12/1960 | Spieth et al. | 126—110 |
| 2,964,034 | 12/1960 | Nordholt et al. | 126—85 |

FREDERICK L. MATTESON, JR., *Primary Examiner.*

E. G. FAVORS, *Assistant Examiner.*